US011078916B2

(12) United States Patent
Hofmann et al.

(10) Patent No.: US 11,078,916 B2
(45) Date of Patent: Aug. 3, 2021

(54) VACUUM PUMP

(71) Applicant: Pfeiffer Vacuum GmbH, Asslar (DE)

(72) Inventors: Jan Hofmann, Gruenberg (DE);
Florian Schneider, Gruenberg (DE)

(73) Assignee: Pfeiffer Vacuum GmbH, Asslar (DE)

( * ) Notice: Subject to any disclaimer, the term of this patent is extended or adjusted under 35 U.S.C. 154(b) by 161 days.

(21) Appl. No.: 16/052,761

(22) Filed: Aug. 2, 2018

(65) Prior Publication Data

US 2019/0040866 A1    Feb. 7, 2019

(30) Foreign Application Priority Data

Aug. 4, 2017  (EP) ..................................... 17185000

(51) Int. Cl.
| | | |
|---|---|---|
| *F04D 19/04* | (2006.01) | |
| *F04D 29/058* | (2006.01) | |
| *F04D 29/048* | (2006.01) | |
| *F16C 17/04* | (2006.01) | |
| *F04D 27/00* | (2006.01) | |

(52) U.S. Cl.
CPC ........... *F04D 19/042* (2013.01); *F04D 19/04* (2013.01); *F04D 19/048* (2013.01); *F04D 27/001* (2013.01); *F04D 29/048* (2013.01); *F04D 29/058* (2013.01); *F16C 17/045* (2013.01); *F04B 2205/01* (2013.01); *F05D 2270/3011* (2013.01); *F16C 2360/45* (2013.01)

(58) Field of Classification Search
CPC ...... F04D 19/042; F04D 19/04; F04D 19/048; F04D 27/001; F04D 29/048; F04D 29/058; F04B 2205/01; F05D 2270/3011
See application file for complete search history.

(56) References Cited

U.S. PATENT DOCUMENTS

| | | | | |
|---|---|---|---|---|
| 5,522,694 A | * | 6/1996 | Bernhardt | ............. F04D 19/048 |
| | | | | 310/90.5 |
| 6,454,524 B1 | | 9/2002 | Okada | |
| 8,087,907 B2 | | 1/2012 | Kawasaki | |
| 2005/0217732 A1 | * | 10/2005 | Tollner | ................ F04D 27/0253 |
| | | | | 137/565.3 |
| 2007/0071610 A1 | | 3/2007 | Holzemer | |

(Continued)

FOREIGN PATENT DOCUMENTS

| | | |
|---|---|---|
| DE | 4410903 | 10/1995 |
| JP | 0674187 | 3/1994 |
| JP | 06159286 | 6/1994 |

(Continued)

OTHER PUBLICATIONS

English Translation of JP H06-74187 (Kase) (Year: 2020).*

(Continued)

*Primary Examiner* — Connor J Tremarche
(74) *Attorney, Agent, or Firm* — Abelman, Frayne & Schwab (57) ABSTRACT

The present invention relates to a vacuum pump, in particular to a turbomolecular pump, having at least one pump stage and having a pressure determination unit for determining a pressure present at a suction side of the vacuum pump, said pump comprising a measurement device, with a measurement tap of the measurement device being provided in the region of the pump stage or downstream of the pump stage.

13 Claims, 9 Drawing Sheets

(56) References Cited

U.S. PATENT DOCUMENTS

2008/0177224 A1* 7/2008 Kelly ................... A61M 1/06
                                                            604/74

FOREIGN PATENT DOCUMENTS

| JP | 0674187 A * | 10/1995 | |
|----|----|----|----|
| JP | 2000038998 A * | 2/2000 | ............. F04D 27/00 |
| JP | 2002147365 | 5/2002 | |
| JP | 2003139055 | 5/2003 | |
| JP | 2005009337 | 1/2005 | |
| JP | 2005009337 A * | 1/2005 | |
| JP | 2005105851 | 4/2005 | |
| JP | 2016169731 | 9/2016 | |

OTHER PUBLICATIONS

English Translation of JP 2000-038998 (Okada) (Year: 2020).*
English Translation of JP 2005-009337 (Yanagisawa) (Year: 2020).*
English Translation of JP H06-74187 (Kase) obtained on Jun. 22, 2020 (Year: 2020).*

* cited by examiner

VACUUM PUMP

The present invention relates to a vacuum pump, in particular to a turbomolecular pump, having at least one pump stage and having a pressure determination unit for determining a pressure present at a suction side of the vacuum pump.

Vacuum pumps are used in different technical areas to generate a vacuum required for the respective process. To ensure a proper operation of the vacuum pump, it is necessary in a number of cases to monitor the pressure present at the suction side.

The Pirani measurement system, that is above all characterized by its inexpensive use with high measurement accuracy, is, for example, used to monitor the process and in particular the pressure. This measurement process and other comparable advantageous and thus economic measurement processes can, however, not be used or can only be used with restrictions at high vacuum pressures (in particular smaller than $5 \cdot 10^{-4}$ mbar) such as are typically provided by a turbomolecular pump due to the respective physical measurement principle.

It is therefore an object of the present invention to provide an inexpensive vacuum pump, in particular a turbomolecular pump, having a measurement device with whose aid the pressure present at the suction side can be reliably determined.

This object is satisfied by a vacuum pump having the features of claim 1.

The vacuum pump in accordance with the invention, in particular a turbomolecular pump, has at least one pump stage and a pressure determination unit for determining a pressure present at a suction side of the vacuum pump that comprises a measurement device, with a measurement tap of the measurement device being provided in the region of the pump stage or downstream of the pump stage—viewed in the axial direction of the vacuum pump. The pressure at the suction side is to be understood here as the pressure before the first pump stage, in particular the pressure in the region of an inlet of the pump.

The problem of pressure determination in high vacuum is avoided by the measurement tap in the region of the pump stage or downstream of the pump stage since the high vacuum pressure at the suction side is not measured directly, but is rather determined indirectly. I.e. a gas pressure is measured with the aid of the measurement device that has already been increased by the pump, i.e. the gas has already been compressed. The pressure of the pump at the expulsion side can also be determined, for example. If the compression power of the pump is known under given conditions, a conclusion can be drawn on the pressure present at the suction side from the measured pressure in the region of or behind the first pump stage or even from the pre-vacuum or roughing vacuum pressure. This already increased (pre-vacuum) pressure can be measured with the aid of an advantageous measurement process (e.g. Pirani). An advantageous measuring tube is connected to the measurement tap for this purpose, for example. The measurement tap can generally be positioned as desired between the start of the first pump stage and the output side of the pump. A measurement tap can here generally be understood as the possibility of sampling or of tapping the locally prevailing pressure to determine a measurement value. The measurement tap can be configured in the most varied manner to enable a local measurement value sampling.

Further embodiments of the invention are set forth in the description, in the dependent claims and in the enclosed drawings.

The pump stage of the vacuum pump in particular comprises at least one rotor and a stator. In the present case in particular an arrangement of at least one respective rotor disk and stator disk should be understood as a pump stage of a vacuum pump, in particular of a turbomolecular pump. The rotor disk is associated with a rotor shaft while the stator disk is arranged in a rotationally fixed manner. A pump stage typically comprises a plurality of rotor disks and stator disks arranged in pairs in a row or behind one another. A vacuum pump, in particular a turbomolecular pump, typically includes a plurality of pump stages of the above-described manner. Pump stages of different designs or constructions can, however, also be provided.

In accordance with a further embodiment, the pump stage of the vacuum pump is configured as a Holweck stage. A Holweck stage is a molecular pump stage having helical pump channels. The rotor here comprises a cylindrical drum having a smooth surface; the coaxial stator is provided with a helical groove at the inner side.

It can furthermore be preferred that the measurement tap is formed as an opening in a housing (one-part or multi-part) of the vacuum pump receiving the pump.

In accordance with a particularly preferred embodiment, the opening of the vacuum pump can also be used as a flood opening, in particular as a flood bore, for flooding the vacuum pump. Only one opening in the housing of the vacuum pump is required or a plurality of functions due to the use of the opening both as a measurement tap or tap opening and as a flood bore. A further error source or also defect position of the vacuum pump is thus thereby avoided and manufacturing costs are reduced. The flood bore is used for flooding or for venting the vacuum pump. A back diffusion of damaging substances (for example hydrocarbons) from the pre-vacuum side through the pump is prevented by the flooding after the switching off of the pump. An entry of water vapor into the pump can admittedly be avoided by flooding with dry inert gas instead of room air. The opening can also be usable as a carrier gas opening.

In accordance with an embodiment, the measurement device of the vacuum pump comprises a pressure sensor for measuring the pressure tapped at the measurement tap, with the measurement tap being in fluid communication with a pressure sensor. The pressure sensor can here be operated with already present accessories at the measurement tap or at the flood opening or flood bore or at the carrier gas opening. The accessory can be a flooding device, for example.

In accordance with a further embodiment, the pressure sensor of the vacuum pump comprises a Pirani vacuum chamber (Pirani measuring tube) or a capacitive measuring tube. The advantage of a use of these components for the pressure sensor above all comprises the cost reduction. The small and comparatively inexpensive measuring tubes can here simply be integrated into the vacuum pump. It additionally has a high measurement accuracy.

The use of any desired pressure sensor types is generally possible, with them also being able to be based on the most varied measurement principles.

It can be particularly advantageous if the pressure determination unit of the vacuum pump is designed such that the pressure present at the suction side can be determined using the pressure tapped at the measurement tap and determined by the measurement device, in particular on the basis of a predefined correction factor that characterizes a ratio of the pressure tapped at the measurement tap to the pressure present at the suction side. The pressure present at the suction side can be calculated with the aid of the tapped pressure due to the correction factor. The pressure present is calculated as:

$$p_{HV} = p_M \cdot S_M / S_{HV} = p_M \cdot K$$

where: $p_{HV}$ high vacuum pressure;
$p_M$ pressure at the measurement tap;
$S_M$ internal suction capacity of the vacuum pump at the measurement tap;
$S_{HV}$ suction capacity of the vacuum pump at the suction side or inlet side; and
K correction factor, corresponds to the quotient from the two suction capacities ($S_M/S_{HV}$).

It becomes clear by the present formula that it is particularly advantageous, where possible to place the measurement tap at a point at which the internal suction capacity $S_M$ is very small since—with given parameters $S_{HV}$ and $p_{HV}$—high pressures are thereby measured at the measurement tap $p_M$.

Suction capacity is understood as a volume flow that can be conveyed per time unit through a cross-sectional surface or a pump-effective section.

In accordance with a particularly preferred embodiment, the vacuum pump comprises at least one means by which at least one operating parameter of the vacuum pump, for example a revolution speed, a drive power, a unit temperature, or a pre-vacuum pressure can be determined and can be transmitted to and/or input into the pressure determination unit. The pressure determination unit can be connected to a control device for controlling/regulating the vacuum pump. It can also be integrated in the control device. It is very generally applicable that the measurement device, the pressure determination unit, and the control device can form a common module. It is also possible only to combine the measurement device and the pressure determination unit to one unit; the two components in particular form an integrated unit. The same applies to the pressure determination unit and the control device. The pressure determination unit can also be a separate unit.

The determination of the pressure present at the suction side is here generally carried out in the pressure determination unit, with the latter—as already explained above—being able to be combined with or integrated in the measurement device and/or the control device. It is, however, also conceivable to carry out some of the calculations for determining the pressure at the suction side in the pressure determination unit and other ones of the calculations in the control device.

The measurement device, the pressure determination unit and/or the control device can furthermore have means for a manual input of data, in particular the operating parameters, such as keys, a touchscreen or similar. Said components can also be configured such that external data can be communicated to them over data lines. The transmission of data can take place in a wireless or wired manner. The input or transmission of data can take place manually, automatically, once, as required and/or cyclically.

In this respect, however, further parameters such as switch states of the valves of the vacuum system (e.g. gas load valve) as well as components of a possible process gas mixture can also be determined, transmitted, or input. By including the different operating parameters, an ongoing state evaluation can evaluate the current reliability of the determined high vacuum pressure. Individual operating parameters that do not have to be determined or have already previously been determined and are still valid can additionally be transmitted or input. The state evaluation can be directly output to the user of the vacuum pump and/or can be stored. It is furthermore possible that a warning signal sounds, for example, as soon as the state evaluation recognizes a critical state or as soon as a corresponding value reaches or leaves a previously determined range. In addition, the output of the high vacuum pressure can be restricted to a predefined range.

It is particularly of advantage if the pressure determination unit is configured such that the correction factor can be modified on the basis of the determined operating parameter. A respective calculation adapted to the prevailing system of the high vacuum pressure present at the suction side is made possible by the modification of the correction factor with the aid of at least one operating parameter. The calculation of the pressure at the suction side hereby becomes even more exact and is independent of process variations or environmental variations and occurring process disruptions or environmental disruptions or time variations of the operating parameters.

The present invention furthermore relates to a method of determining a pressure present at a suction side of a vacuum pump (in particular a turbomolecular pump), with the pump preferably being configured in accordance with any one of the above-described embodiments. The method in accordance with the invention is characterized in that a pressure present in the region of a pump stage of the vacuum pump or downstream of the pump stage in the vacuum pump is measured to determine said pressure and the pressure present at the suction side is determined on the basis of the measured pressure.

In accordance with an advantageous embodiment of the method in accordance with the invention, a correction factor is determined that characterizes a ratio of the pressure tapped at the measurement tap to the pressure present at the suction side, with the determination of the correction factor in particular taking place ex works and/or at the deployment site. Both unchanging operating parameters and operating parameters that change over time can hereby flow into the correction factor. A determination of the correction factor can here be carried out, for example, for every single vacuum pump before every putting into operation. It is, however, likewise possible to determine this only once, randomly, according to schedule, outside standard operation, or on a change of the use and/or of the process gas composition.

In accordance with a further embodiment of the method, at least one operating parameter of the vacuum pump, for example a revolution speed or a pre-vacuum pressure, is determined and is transmitted to or input into a pressure determination unit of the vacuum pump.

In a further embodiment of the method, the correction factor is modified, in particular during the operation of the pump, on the basis of the determined or input operating parameter. A plurality of operating parameters are preferably taken into account in the modification of the correction factor to obtain a reliable correction factor and thus a reliable calculated value of the pressure present at the suction side. In other words, it is taken into account in this embodiment that the correction factor can be a function of one or more operating parameters. If these operating parameters change, the correction factor is also adapted accordingly in order always to obtain a reliable value for the pressure present at the suction side.

In accordance with a further preferred embodiment, a state evaluation parameter is determined on the basis of the operating parameter, in particular while considering the measured pressure and/or the determined pressure present at the suction side, said state evaluation parameter being output and/or stored, in particular if the state evaluation parameter falls below or exceeds a threshold value or leaves a predetermined value range. A plurality of operating parameters ideally flow into the state evaluation parameter for a reliable state evaluation. The state evaluation parameter enables an estimation of the reliability of the calculated pressure present at the suction side.

In addition, a further additional pre-vacuum pressure sensor can be present that can be used to validate the calculated high vacuum pressure.

The invention will be described in the following by way of example with reference to advantageous embodiments and to the enclosed Figures. There are shown, schematically in each case.

Figure 1:
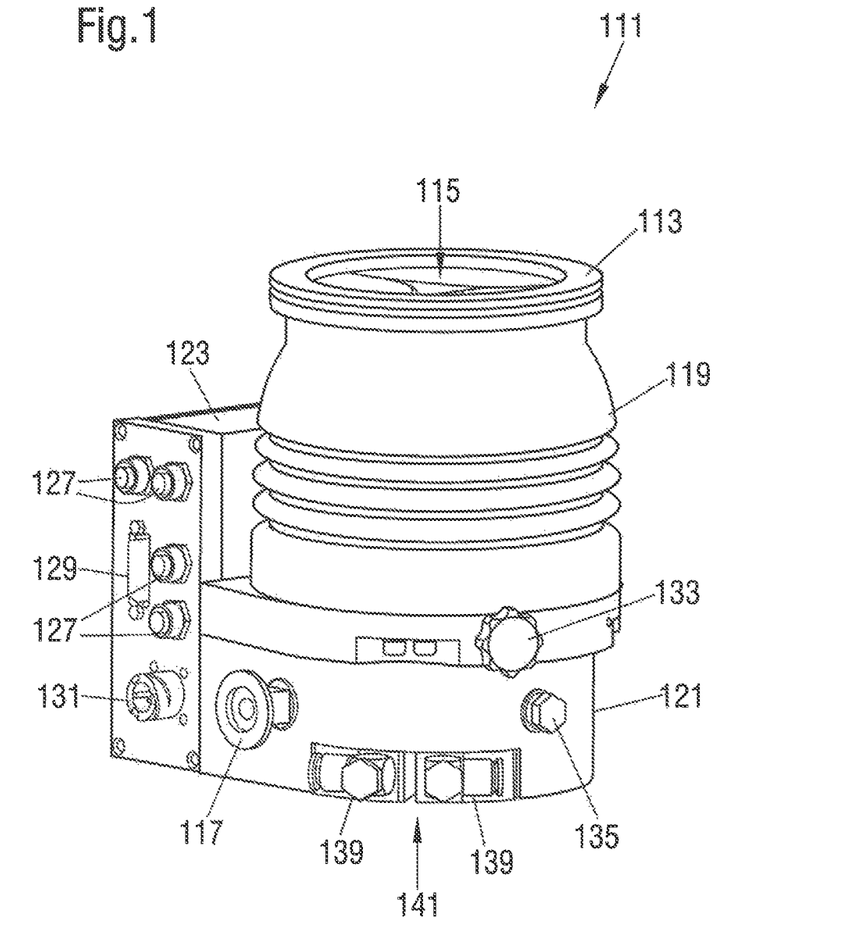
FIG. 1 a perspective view of a turbomolecular pump.

The turbomolecular pump 111 shown in FIG. 1 comprises a pump inlet 115 which is surrounded by an inlet flange 113 and to which a recipient, not shown, can be connected in a manner known per se. The gas from the recipient can be sucked out of the recipient via the pump inlet 115 and can be conveyed through the pump to a pump outlet 117 to which a pre-vacuum pump such as a rotary vane pump can be connected.

The inlet flange 113 forms the upper end of the housing 119 of the vacuum pump 111 in the alignment of the vacuum pump in accordance with FIG. 1. The housing 119 comprises a lower part 121 at which an electronics housing 123 is laterally arranged. Electrical and/or electronic components of the vacuum pump 111 are accommodated in the electronics housing 123, e.g. to operate an electric motor 125 arranged in the vacuum pump. A plurality of connectors 127 for accessories are provided at the electronics housing 123. In addition, a data interface 129, e.g. in accordance with the RS485 standard, and a power supply connector 131 are arranged at the electronics housing 123.

A flood inlet 133, in particular in the form of a flood valve, via which the vacuum pump 111 can be flooded, is provided at the housing 119 of the turbomolecular pump 111. In the region of the lower part 121, a barrier gas connector 135 is furthermore arranged which is also called a purge gas connector and via which purge gas can be supplied to the motor space 137 in which the electric motor 125 is accommodated in the vacuum pump 111 to protect the electric motor 125 from the gas conveyed by the pump. Two coolant connectors 139 are furthermore arranged in the lower part 121, with one of the coolant connectors being provided as an inlet and the other coolant connector being provided as an outlet for coolant that can be conducted into the vacuum pump for cooling purposes.

The lower side 141 of the vacuum pump can serve as a standing surface so that the vacuum pump 111 can be operated in a standing position on the lower side 141. The vacuum pump 111 can, however, also be fastened to a recipient via the inlet flange 113 and can thus so-to-say be operated in a suspended manner. In addition, the vacuum pump 111 can be designed such that it can also be taken into operation when it is aligned in a different manner to that shown in FIG. 1. Embodiments of the vacuum pump can also be implemented in which the lower side 141 can be arranged not directed downwardly, but rather facing to the side or to the top.

Figure 2:
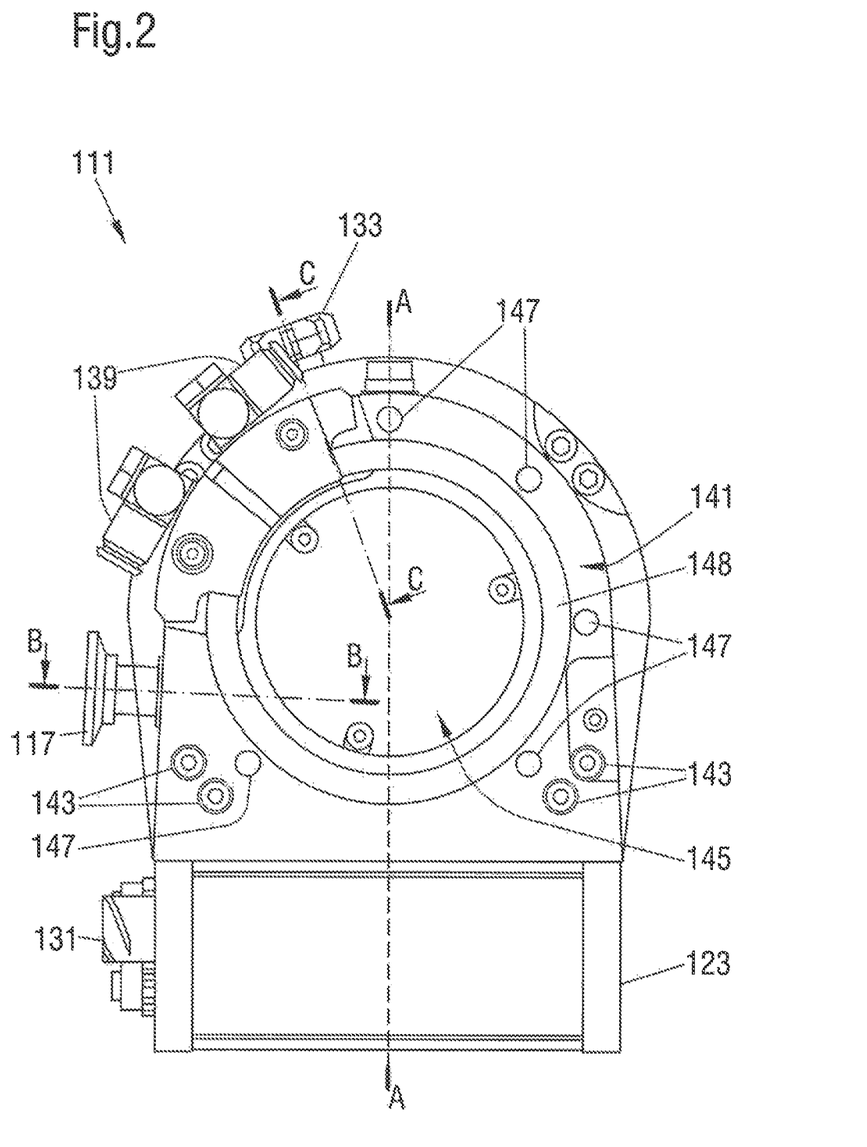
FIG. 2 a view of the lower side of the turbomolecular pump of FIG. 1.

Various screws 143 by means of which components of the vacuum pump that are not further specified here are fastened to one another are arranged at the lower side 141 that is shown in FIG. 2. A bearing cap 145 is, for example, fastened to the lower side 141.

In addition, fastening bores 147 via which the pump 111 can, for example, be fastened to a support surface are arranged at the lower side 141.

A coolant line 148 is shown in FIGS. 2 to 5 in which the coolant led in and out via the coolant connectors 139 can circulate.

Figure 3:
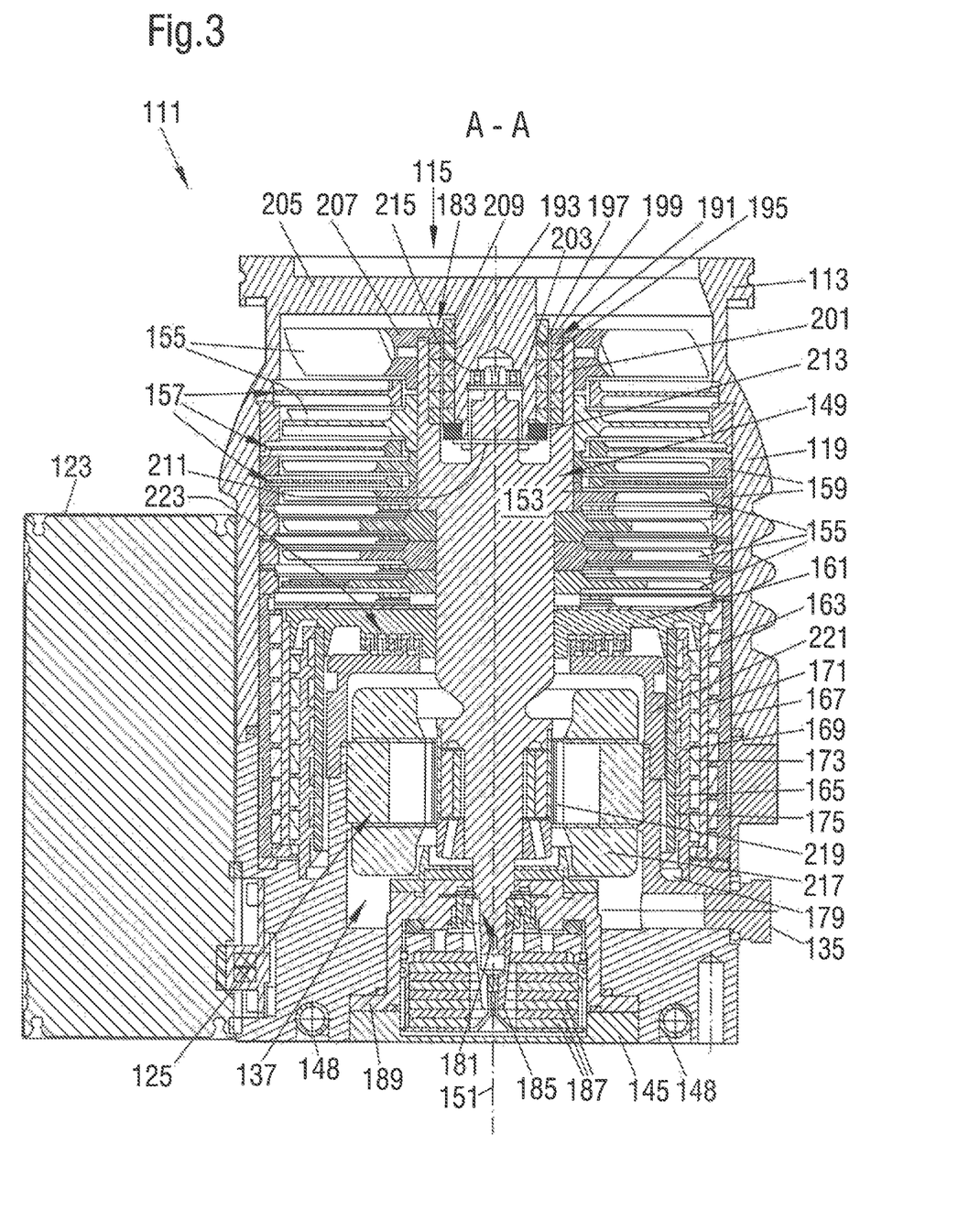
FIG. 3 a cross-section of the turbomolecular pump along the line A-A shown in FIG. 2.
Figure 4:
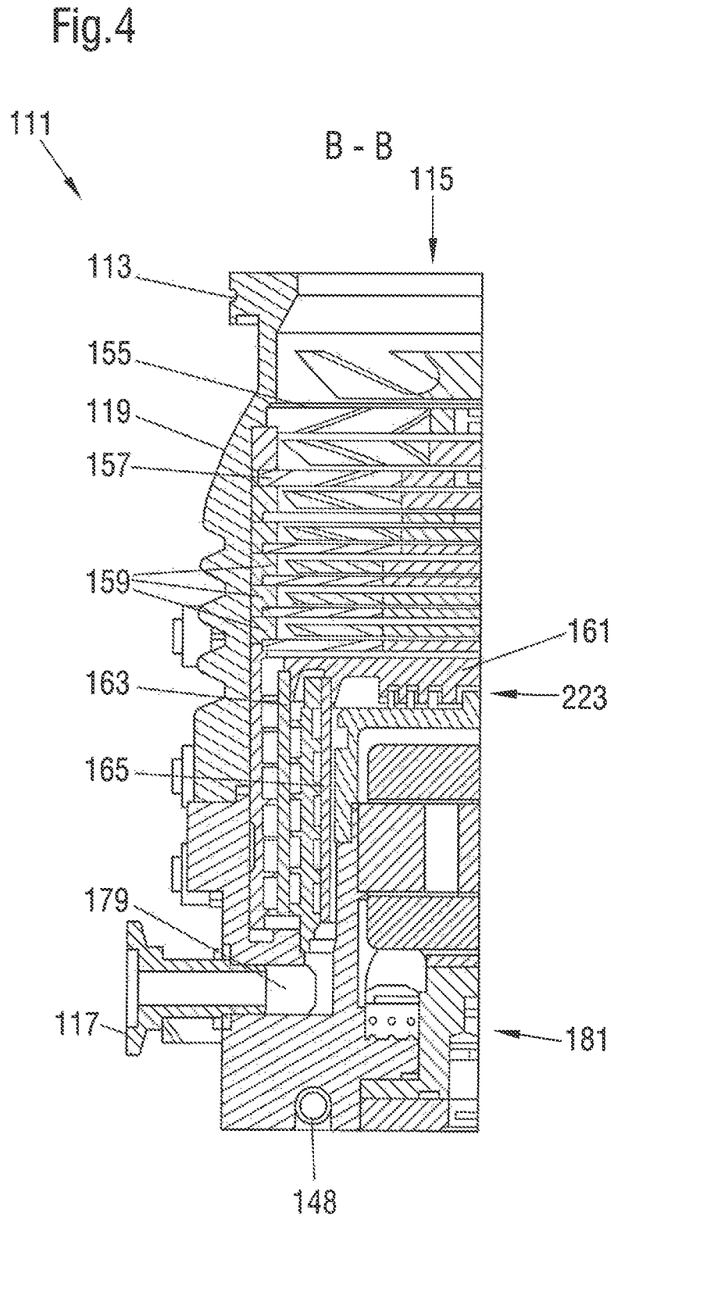
FIG. 4 a cross-sectional view of the turbomolecular pump along the line B-B shown in FIG. 2.
Figure 5:
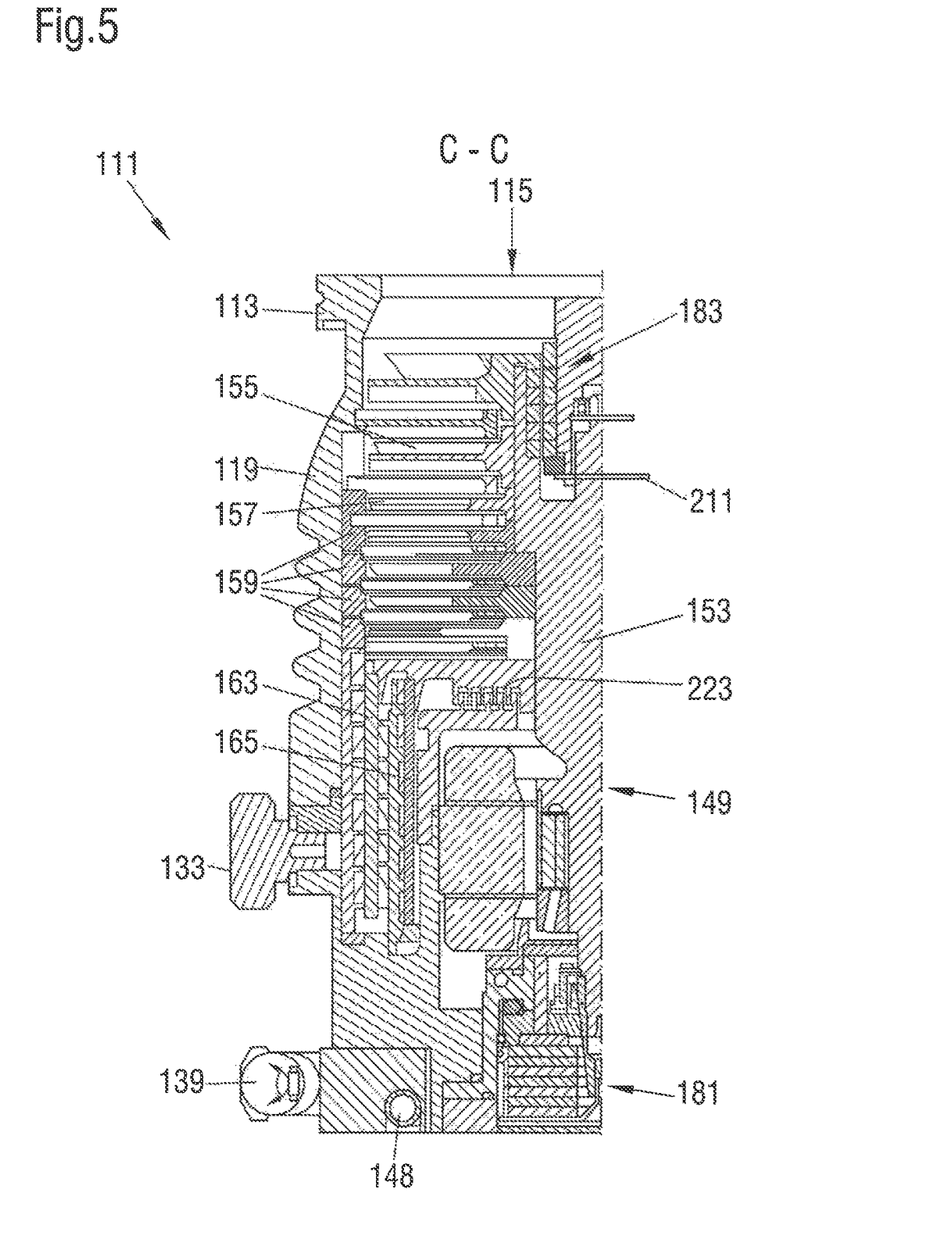
FIG. 5 a cross-sectional view of the turbomolecular pump along the line C-C shown in FIG. 2.

As the cross-sectional views of FIGS. 3 to 5 show, the vacuum pump comprises a plurality of process gas pump stages for conveying the process gas present at the pump inlet 115 to the pump outlet 117.

A rotor 149 is arranged in the housing 119 and has a rotor shaft 153 rotatable about an axis of rotation 151.

The turbomolecular pump 111 comprises a plurality of turbomolecular pumps connected to one another in series in a pump-effective manner and having a plurality of radial rotor disks 155 fastened to the rotor shaft 153 and a plurality of stator disks 157 arranged between the rotor disks 155 and fixed in the housing 119. A rotor disk 155 and an adjacent stator disk 157 each form one turbomolecular pump stage here. The stator disks 157 are held by spacer rings 159 at a desired axial spacing from one another.

The vacuum pump additionally comprises Holweck pump stages arranged in one another in a radial direction and connected to one another in series in a pump-effective manner. The rotor of the Holweck pump stages comprises a rotor hub 161 arranged at the rotor shaft 153 and two Holweck rotor sleeves 163, 165 which are fastened to the rotor hub 161, which are supported by it, which are in cylinder jacket shape, which are orientated coaxially to the axis of rotation 151, and which are nested in one another in a radial direction. Furthermore, two Holweck stator sleeves 167, 169 are provided which are of cylinder jacket shape, which are likewise orientated coaxially to the axis of rotation 151 and which are nested in one another viewed in a radial direction.

The pump-effective surfaces of the Holweck pump stages are formed by the jacket surfaces, that is by the radial inner surfaces and/or outer surfaces, of the Holweck rotor sleeves 163, 165 and of the Holweck stator sleeves 167, 169. The radial inner surface of the outer Holweck stator sleeve 167 is disposed opposite the radial outer surface of the outer Holweck rotor sleeve 163 while forming a radial Holweck gap 171 and forms the first Holweck pump stage following the turbomolecular pumps with it. The radial inner surface of the outer Holweck rotor sleeve 163 is disposed opposite the radial outer surface of the inner Holweck stator sleeve 169 while forming a radial Holweck gap 173 and forms a second Holweck pump stage with it. The radial inner surface of the inner Holweck stator sleeve 169 is disposed opposite the radial outer surface of the inner Holweck rotor sleeve 165 while forming a radial Holweck gap 175 and forms the third Holweck pump stage with it.

A radially extending channel can be provided at the lower end of the Holweck rotor sleeve 163 and the radially outwardly disposed Holweck gap 171 is connected via it to the middle Holweck gap 173. In addition, a radially extending channel via which the middle Holweck gap 173 is connected to the radially inwardly disposed Holweck gap 175 can be provided at the upper end of the inner Holweck stator sleeve 169. The Holweck pump stages nested in one another are thereby connected to one another in series. A connection channel 179 to the outlet 117 can furthermore be provided at the lower end of the radially inwardly disposed Holweck rotor sleeve 165.

The above-named pump-effective surfaces of the Holweck stator sleeves 163, 165 each have a plurality of Holweck grooves extending in the axial direction spirally about the axis of rotation 151 while the oppositely disposed jacket surfaces of the Holweck rotor sleeves 163, 165 are smooth and drive the gas for operating the vacuum pump 111 in the Holweck grooves.

A roller element bearing 181 is provided in the region of the pump outlet 117 and a permanent magnet bearing 183 is provided in the region of the pump inlet 115 for the rotatable support of the rotor shaft 153.

In the region of the roller element bearing 181, a conical splash nut 185 is provided which has an outer diameter increasing toward the roller element bearing 181. The splash nut 185 is in sliding contact with at least one wiper of an operating medium store. The operating medium store comprises a plurality of absorbent disks 187 which are stacked on one another and which are saturated with an operating medium for the roller element bearing 181, e.g. with a lubricant.

In the operation of the vacuum pump 111, the operating medium is transferred by capillary action from the operating medium store via the wiper to the rotating splash nut 185 and is conveyed as a consequence of the centrifugal force along the splash nut 185 in the direction of the outer diameter of the splash nut 185, which becomes larger, to the roller element bearing 181, where it e.g. satisfies a lubricating function. The roller element bearing 181 and the operating medium store are encompassed in the vacuum pump by a tub-shaped insert 189 and by the bearing cap 145.

The permanent magnet bearing 183 comprises a bearing half 193 at the rotor side and a bearing half 193 at the stator side which each comprise a ring stack of a plurality of permanently magnetic rings 195, 197 respectively stacked on one another in the axial direction. The ring magnets 195, 197 are disposed opposite one another while forming a radial bearing gap 199, with the ring magnets 195 at the rotor side being arranged radially outwardly and the ring magnets 197 at the stator side being arranged radially inwardly. The magnetic field present in the bearing gap 199 effects magnetic repulsion forces between the ring magnets 195, 197 which effect a radial support of the rotor shaft 153. The ring magnets 195 at the rotor side are carried by a carrier section 201 of the rotor shaft 153, the carrier section surrounding the ring magnets 195 at the radially outer side. The ring magnets 197 at the stator side are carried by a carrier section 203 at the stator side which extends through the ring magnets 197 and is suspended at radial struts 205 of the housing 119. The ring magnets 195 at the rotor side are fixed in parallel with the axis of rotation 151 by a cover element 207 coupled to the carrier section 203. The ring magnets 197 at the stator side are fixed in parallel with the axis of rotation 151 in the one direction by a fastening ring 209 connected to the carrier section 203 and by a fastening ring 211 connected to the carrier section 203. A plate spring 213 can additionally be provided between the fastening ring 211 and the ring magnets 197.

An emergency bearing or safety bearing 215 is provided within the magnetic bearing; it idles in the normal operation of the vacuum pump 111 without contact and only moves into engagement on an excessive radial deflection of the rotor 149 relative to the stator to form a radial abutment for the rotor 149 since a collision of the structures at the rotor side with the structures at the stator side is prevented. The safety bearing 215 is configured as a non-lubricated roller element bearing and forms a radial gap with the rotor 149 and/or the stator, said gap having the effect that the safety bearing 215 is out of engagement in normal pump operation. The radial deflection at which the safety bearing 215 comes into engagement is dimensioned sufficiently large that the safety bearing 215 does not move into engagement in the normal operation of the vacuum pump and is simultaneously small enough that a collision of the structures at the rotor side with the structures at the stator side is avoided under all circumstances.

The vacuum pump 111 comprises the electric motor 125 for a rotating driving of the rotor 149. The armature of the electric motor 125 is formed by the rotor 149 whose rotor shaft 153 extends through the motor stator 217. A permanent magnet arrangement can be arranged at the radially outer side or in an embedded manner on the section of the rotor shaft 153 extending through the motor stator 217. An intermediate space 219 which comprises a radial motor gap via which the motor stator 217 and the permanent magnet arrangement 128 can have a magnetic influence for transferring the drive torque is arranged between the motor stator 217 and the section of the rotor 149 extending through the motor stator 217.

The motor stator 217 is fixed in the housing within the motor space 137 provided for the electric motor 125. A barrier gas that is also called a purge gas and which can be air or nitrogen, for example, can reach the motor space 137 via the barrier gas connector 135. The electric motor 125 can be protected from process gas, e.g. from corrosively active portions of the process gas, via the barrier gas. The motor space 137 can also be evacuated via the pump outlet 117, i.e. the vacuum pressure effected by the pre-vacuum pump connected to the pump outlet 117 is at least approximately present in the motor space 137.

In addition, a so-called labyrinth seal 223 that is known per se can be provided between the rotor hub 161 and a wall 221 bounding the motor space 137, in particular to achieve a better sealing of the motor space 217 with respect to the Holweck pump stages disposed radially outside.

Figure 6:
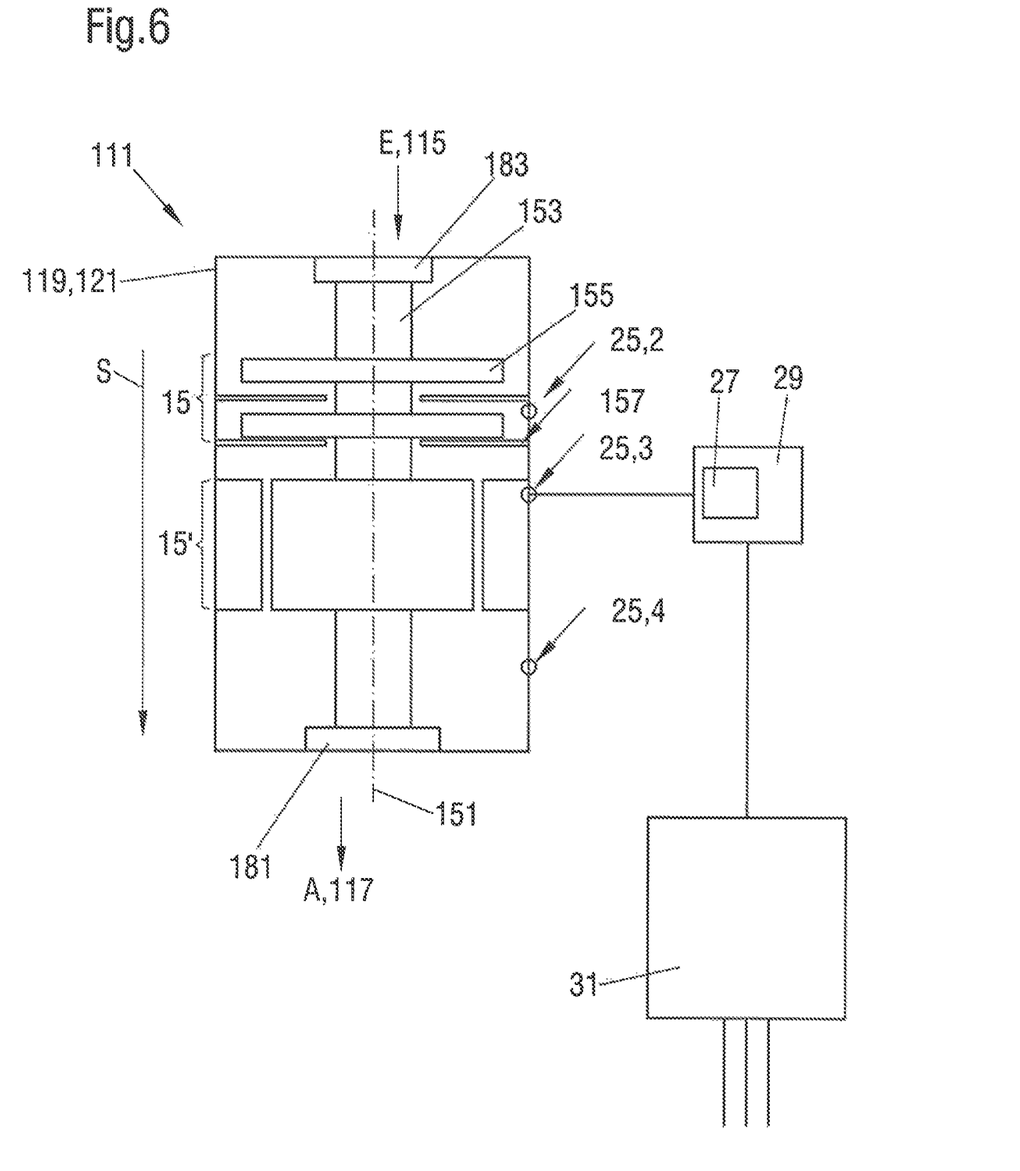
FIG. 6 a schematic view of a first embodiment of the vacuum pump in accordance with the invention with an integrated, inexpensive pressure measurement.

FIG. 6 shows a vacuum pump 111 that is in particular a turbomolecular pump in which the concept in accordance with the invention has been implemented. The vacuum pump 111 can generally be designed like the pumps 111 described with reference to FIGS. 1-5 or the concept in accordance with the invention can be easily integrated in these pumps 111. It can, however, generally also be integrated in turbomolecular pumps of a different type of construction or in different pump types.

The vacuum pump 111 comprises a housing 119 that receives at least one pump stage 15 and that can also comprise the above-described lower part 121. The pump stage 15 has a plurality of rotor disks 155 and stator disks 157 (only two disk pairs 155, 157 are shown by way of example). A pump stage 15' configured as a Holweck stage can also be provided (only schematically indicated). The rotating components of the pump stages 15, 15' are rotationally fixedly connected to a pump shaft 153, with the latter being rotatably supported about the axis of rotation 151 of the vacuum pump 111 in suitable bearings 181, 183.

To determine the pressure present at the inlet side (E) of the pump 111, a measurement tap is provided that is not exposed to the pressure before the first pump stage 15, but is rather located—viewed in the axial direction of the pump 111, i.e. viewed from the inlet side E along the axis of rotation 151—in the region of or behind the first pump stage 15 where there is already a higher pressure due to the action of the pump 111. Such a measurement tap can, for example, be an opening 25.2 that is introduced into the housing 119, 121 in the region of the first pump stage 15. Alternatively and additionally, an opening 25.3 or 25.4 is formed in the housing 119, 121 in the region of the Holweck stage 15' or downstream of the pump stages 15, 15' in the flow direction S of the pumped gas.

It is generally sufficient only to provide one of the openings 25.2 to 25.4 to implement the concept in accordance with the invention. A plurality of openings can, however, be present to be able to use the pump 111 more flexibly. This also applies to the pump 111 in accordance with FIG. 8 that will be described in the following.

The openings 25.2 to 25.4 can act both as measurement taps and as flood openings or carrier gas openings. A sensor 27 is connected to the measurement tap or to the openings 25.2 to 25.4 or is directly affixed there. The sensor 27 is part of a measurement device 29 and, for example, comprises an advantageous measuring tube. The measurement device 29 is connected to or integrated in a pressure determination unit 31. The pressure determination unit 31 is preferably connected to or is integrated in a control device (not shown) of the pump 111. On operation of the vacuum pump 111, the gas to be pumped off flows in at the inlet side E, 115 and out at the outlet side A, 117.

The pressure present at the suction side or inlet side E is determined with the aid of the pressure determination unit 31. On the measurement of the pressure within the pump stages 15, 15' or downstream of the pump stages 15, 15', above all a Pirani vacuum gauge or a capacitive measuring tube can be used. Since a pressure is present in the region of the openings 25.2 to 25.4 that is higher than the high vacuum pressure present at the suction side E, those inexpensive measuring tubes can be used. It is also possible to draw a conclusion on the high vacuum pressure present at the suction side E from a measured pre-vacuum pressure.

The pressure tapped by the sensor 27 in the openings 25.2 to 25.4 and measured in the measurement device 29 is converted with the aid of the pressure determination unit 31 and of a correction factor into the high vacuum pressure present at the suction side to be determined. One or more operating parameters (that can be determined by sensors, not shown, and can be detected by the pressure determination unit 31 or by the control device) can be taken into account here. The operating parameter(s) determined or also previously known can be fed or input into the pressure determination unit 31 or control device. A plurality of different parameters can be understood as the operating parameters. The more relevant operating parameters flow into the correction factor, the more exact the later determined high pressure vacuum is. The operating parameters can be continuously detected in the operation of the pump 111 and can flow into the calculation of the correction factor K to always obtain an exact value for the high vacuum present at the input side.

A state evaluation can furthermore additionally take place with the aid of the measurement device 29, of the pressure determination unit 31 and/or of the control device.

Figure 7:
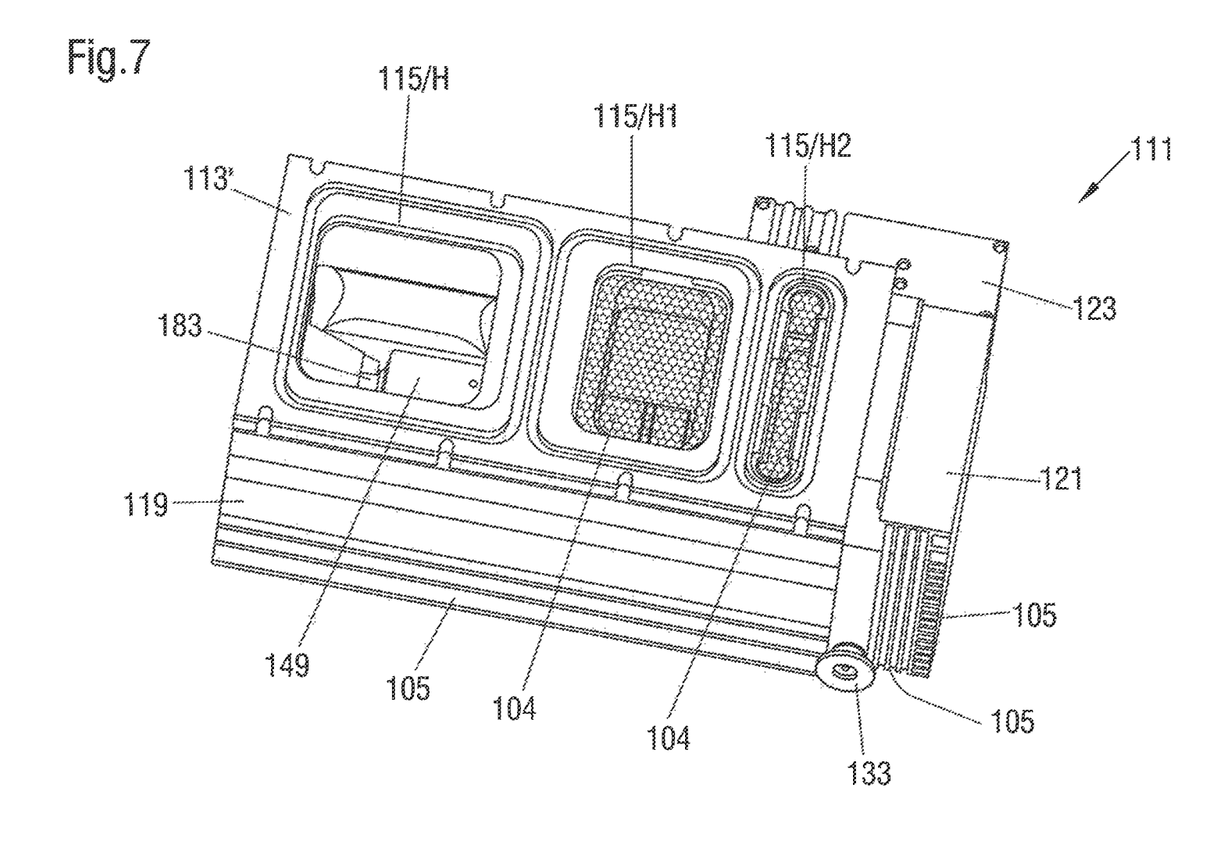
FIG. 7 a perspective view of a turbomolecular pump with a plurality of inlets.

The turbomolecular pump 111 shown in FIG. 7 can correspond in its basic design to that of the pump 111 shown in FIGS. 1 to 5. The turbomolecular pump 111 of FIG. 7 has a lateral inlet flange 113 that is arranged in this case in parallel with the axis of rotation 151 and that has a plurality of pump inlets 115 that are designated continuously starting at the high vacuum side by H, H1, H2, and so on. The rotor 149 is supported by the magnetic bearing 183 at the high vacuum side. The pump stages associated with the rotor 149 are at least partly arranged axially spaced apart from one another. The pump stages are advantageously at least partly arranged between the pump inlets H, H1, H2. A pump inlet can nevertheless also be arranged directly in the region of or at the axial level of a pump stage.

Each pump inlet H, H1, H2 has its own characteristics (e.g. suction capacity, compression, ...) typically different from the other inlets and different pressures are correspondingly present there during the operation of the vacuum pump 111. Conveyed gases from the inlet 115/H are conveyed by the rotor 149 up to the region in which the pump inlet 115/H1 is disposed. The gas flow from the pump inlet 115/H1 comes in there and is conveyed in common onward up to the region in which the pump inlet 115/H2 is disposed. This procedure is continued analogously to the described pattern over the generally unlimited number of pump inlets 115/$H_n$ and the pump stages up to the pump outlet 117. Recipients, not shown, (e.g. different regions of a vacuum process chamber in which different tasks or process steps are simultaneously carried out that each require different vacuum pressures and gas flows) can respectively be connected to the pump inlets H, H1, H2.

The pump inlets 115/H1 and 115/H2 are provided with protection devices 104 that prevent the penetration of foreign bodies. The lower part 121 adjoins the housing 119 (or forms a housing receiving the pump stages together therewith) and supports cooling ribs 105 that are arranged at a plurality of side surfaces of the lower part 121 in different orientations/configurations. Further cooling ribs 105 can be provided at the surfaces of the housing 119 remote from the pump inlet 115. The electronics housing 123 and the flood inlet 133 are furthermore arranged at the housing 119. Their positioning can be freely selected as required within the framework of the technical circumstances. They can be positioned at different surfaces of the lower part 121 or also of the housing 119. The pump inlet 117 and the barrier gas connector 135 are arranged at the rear side of the pump 111 and are therefore not visible in the selected perspective.

Figure 8:
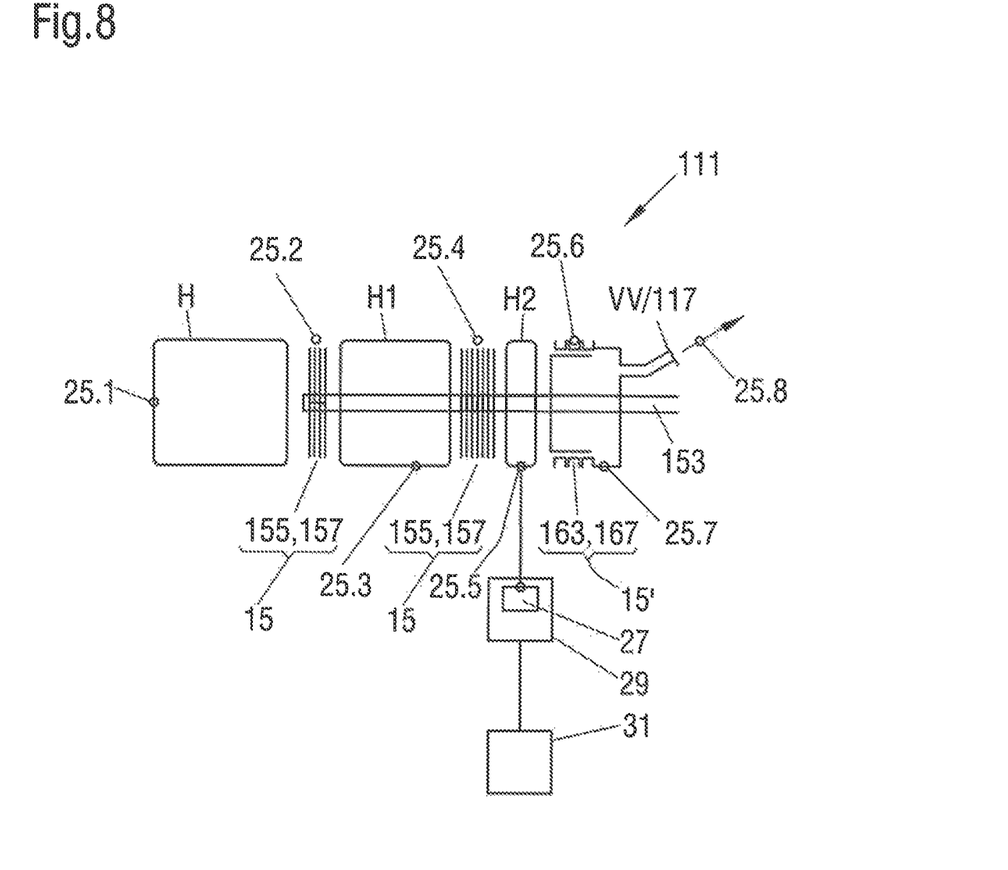
FIG. 8 a schematic view of a second embodiment of the vacuum pump in accordance with the invention with an integrated, inexpensive pressure measurement.

FIG. 8 shows a pump 111 having a plurality of inlets such as have been described above by way of example with reference to FIG. 7. It comprises a rotor shaft 153 at which at least two pump stages 15 are arranged. The pump stages 15 can be designed as turbomolecular pump stages having at least one rotor disk 155 arranged at the rotor shaft 153 and having at least one stator disk 157 fastened in the housing 119, 121, not shown. In the embodiment of the pump 111 shown by way of example, a Holweck pump stage 15' is also provided having at least one Holweck rotor sleeve 163 optionally fastened indirectly to the rotor shaft 153 via the rotor hub 161 and having a Holweck stator sleeve 167 fastened in the housing 119, 121, not shown. Pump stages based on other principles of action such as Siegbahn pump stages or side channel pump stages can alternatively or additionally be provided.

The pump inlet H is arranged before the first pump stage 15 at the high vacuum side of the vacuum pump 111; the pump inlets H1 and H2 are arranged between individual ones or groups of pump stages 15, 15'; and the pump inlet 117/VV is arranged at the pre-vacuum side of the vacuum pump behind the pump stages 15, 15' and conducts the pumped medium further to a pre-vacuum pump, not shown.

Openings 25.1 to 25.8 are provided at different positions of the vacuum pump and can be used as required in a tailored manner as measurement taps, flood inlets 133, barrier gas inlets 135, process gas inlets, pre-vacuum connectors 117/VV, or for other purposes than inlets or outlets.

A measurement tap 25.1 that is provided with a complex and expensive pressure measurement device in the prior art is conventionally provided in the region of the pump inlet H to determine the vacuum pressure at the inlet side or at the high vacuum side. This can be avoided in accordance with the invention in that a simpler, more advantageous pressure measurement device is used at one of the other openings or measurement taps 25.2 to 25.7, that is in a region at, between, or behind the pump stages 15, 15' where a higher pressure is already present due to the action of the pump 111.

If a complex system is connected to the inlets H, H1, H2, e.g. a system having communicating vacuum chambers, the pressure present at the suction side can likewise be determined in the manner described above with the aid of comparatively simple pressure measurements at the openings/taps 25.2 to 25.7 as soon as the pressure relationships have reached equilibrium in the system.

Figure 9:
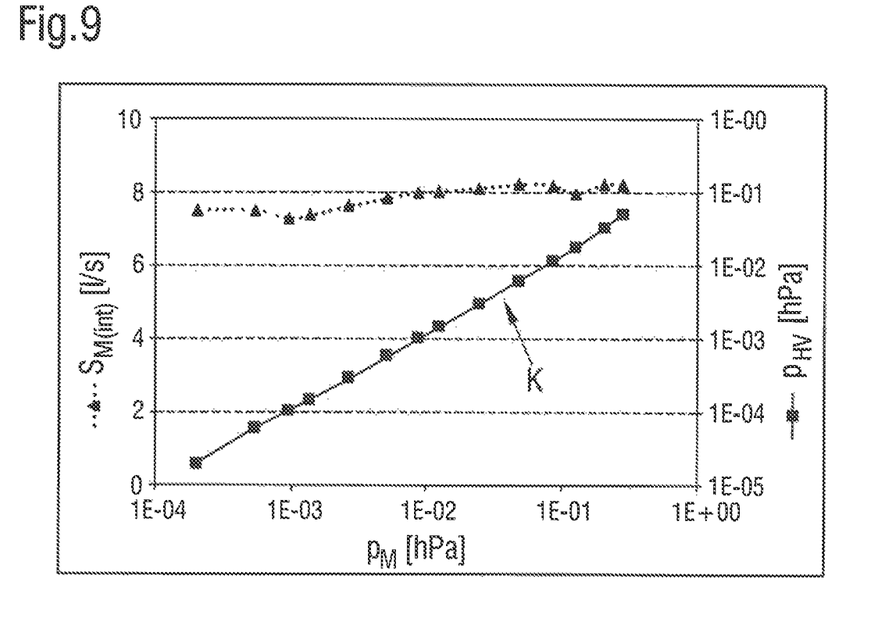
FIG. 9 a ratio of $p_M$ to $p_{HV}$ below the illustration of the correction factor and the ratio of $p_M$ to the internal suction capacity of the vacuum pump at the measurement tap.

FIG. 9 shows the ratio between the measured pressure at the measurement tap $p_M$ and the calculated high vacuum pressure $p_{HV}$. The ratio is the correction factor K initially discussed multiple times. As a rule, it depends on a plurality of operating parameters of the pump and of the gas mixture to be conveyed. In the present example, the ratio between the pressures $p_M$ and $p_{HV}$ is a linear function so that the measured pressure $p_m$ only has to be multiplied, at least in the shown pressure interval, by a constant correction factor K to obtain the pressure $p_{HV}$. The gas to be conveyed is nitrogen in the example shown. The internal suction capacity $S_M$ is furthermore shown that has a direct influence on the quality of the determined pressure. K is substantially constant in the present example due to the stability of the parameter $S_M$.

Figure 10:
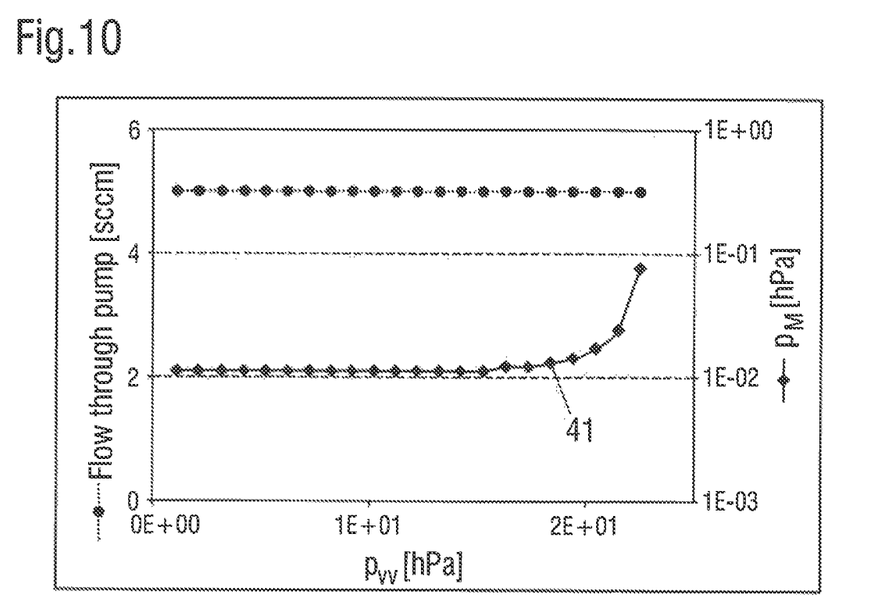
FIG. 10 a ratio of $p_{VV}$ (pre-vacuum pressure) to $p_{HV}$ with a substantially constant gas flow through the pump.

FIG. 10 shows the ratio between the outlet pressure $p_{VV}$ and the measured pressure at the measurement tap $p_M$ under the condition that a constant gas flow is present through the pump and thus also a constant high vacuum pressure $p_{HV}$. $p_M$ remains constant over a wide outlet pressure range/pre-vacuum pressure range; the pressure $p_M$ only starts to increase in the kink region 41 at a prevailing pressure of approximately 20 hPa so that it can no longer easily be used alone to calculate $p_{HV}$; the pressure $p_{VV}$ must rather enter into the calculation of K as an additional parameter. The quality or performance capability, in particular the compression and the possible gas throughput, of the pump stage downstream of the measurement tap is correspondingly decisive for the pre-vacuum compatibility of the measurement method.

REFERENCE NUMERAL LIST 15, 15" pump stage
25.1 conventional measurement tap
25.2 to 25.7 opening/measurement tap
25.8 opening
27 sensor
29 measurement device
31 pressure determination unit
41 41 kink region
104 protective device
105 cooling rib
111 turbomolecular pump
113 inlet flange
115, H, H1, H2 pump inlet
117 pump outlet
119 housing
121 lower part
123 electronics housing
125 electric motor
127 accessory connector
129 data interface
131 power supply connector
133 flood inlet
135 barrier gas connector
137 motor space
139 coolant connector
141 lower side
143 screw
145 bearing cap
147 fastening bore
148 coolant line
149 rotor
151 axis of rotation
153 rotor shaft
155 rotor disk
157 stator disk
159 spacer ring
161 rotor hub
163 Holweck rotor sleeve
165 Holweck rotor sleeve
167 Holweck stator sleeve
169 Holweck stator sleeve
171 Holweck gap
173 Holweck gap
175 Holweck gap
179 connection channel
181 roller element bearing
183 permanent magnet bearing
185 splash nut
187 disk
189 insert
191 bearing half at the rotor side
193 bearing half at the stator side
195 ring magnet
197 ring magnet
199 bearing gap
201 support section
203 support section
205 radial strut
207 cover element
209 support ring
211 fastening ring
213 plate spring
215 emergency bearing or safety bearing
217 motor stator
219 intermediate space
221 wall
223 labyrinth seal A outlet side
E inlet side
S flow direction
K correction factor
VV pre-vacuum

The invention claimed is:

1. A vacuum pump having:
   at least one pump stage, and
   a pressure determination unit configured to determine a pressure present at a suction side of the vacuum pump and the pressure determination unit comprising a measurement device,
   a measurement tap of the measurement device provided in a region of at least one of the at least one pump stage and downstream of the at least one pump stage;
   wherein the pressure determination unit is configured to receive input signals corresponding to pressure measurements taken at the measurement tap, the pressure determination unit determining the pressure present at the suction side of the vacuum pump based on a product of the pressure measurement taken at the measurement tap and a correction factor, the correction factor being a quotient of internal suction capacity of the vacuum pump at the measurement tap to suction capacity of the vacuum pump at the suction side of the vacuum pump; and
   at least one means with which at least one operating parameter of the vacuum pump is determined and transmitted and/or input into the pressure determination unit, and wherein the pressure determination unit is configured such that the correction factor is modified on a basis of the determined at least one operating parameter or an input operating parameter.

2. The vacuum pump in accordance with claim 1, wherein the at least one pump stage comprises at least one rotor and a stator.

3. The vacuum pump in accordance with claim 1, wherein the at least one pump stage comprises a Holweck stage.

4. The vacuum pump in accordance with claim 1, wherein the measurement tap is configured as an opening in a housing of the vacuum pump receiving the at least one pump stage.

5. The vacuum pump in accordance with claim 4, wherein the opening is also usable as a flood opening for flooding the vacuum pump or as a carrier gas opening.

6. The vacuum pump in accordance with claim 1, wherein the measurement device comprises a pressure sensor for measuring the pressure tapped at the measurement tap, with the measurement tap being in fluid communication with the pressure sensor.

7. The vacuum pump in accordance with claim 6, wherein the pressure sensor is a Pirani vacuum gauge or comprises a capacitive measuring tube.

8. The vacuum pump in accordance with claim 1, wherein the at least one operating parameter of the vacuum pump is selected from at least one of a revolution speed, a drive power, a unit temperature, a pre-vacuum pressure.

9. The vacuum pump in accordance with claim 1, wherein the pressure determination unit is configured such that the correction factor is modified on a basis of a gas mixture being conveyed.

10. The vacuum pump in accordance with claim 1, further comprising an inlet port formed at the suction side of the vacuum pump and an exhaust port, wherein the at least one measurement tap is positioned intermediate of the inlet port and the exhaust port.

11. The vacuum pump in accordance with claim 1, wherein the at least one means comprises a sensor to provide the at least one operating parameters to the pressure determination unit.

12. The vacuum pump in accordance with claim 1, wherein the at least one means comprises a data communication line to provide the at least one operating parameter to the pressure determination unit.

13. The vacuum pump in accordance with claim 1, wherein the at least one means comprises a manual input device to input the at least one operating parameter into the pressure determination unit.

* * * * *